United States Patent
Mallik et al.

(10) Patent No.: US 9,553,647 B2
(45) Date of Patent: Jan. 24, 2017

(54) DETERMINISTIC PROCESSING FOR MIMO SYSTEMS

(75) Inventors: Ranjan K. Mallik, NewDelhi (IN); Manav R. Bhatnagar, NewDelhi (IN); Jack Winters, Middletown, NJ (US)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 284 days.

(21) Appl. No.: 13/405,734

(22) Filed: Feb. 27, 2012

(65) Prior Publication Data

US 2012/0219081 A1    Aug. 30, 2012

Related U.S. Application Data

(60) Provisional application No. 61/447,237, filed on Feb. 28, 2011.

(51) Int. Cl.
*H04L 1/02* (2006.01)
*H04B 7/06* (2006.01)

(52) U.S. Cl.
CPC .......... *H04B 7/0617* (2013.01); *H04B 7/0619* (2013.01)

(58) Field of Classification Search
CPC ... H04B 7/0617; H04B 7/0417; H04B 7/0626; H04B 7/0413; H04L 25/0224; H04L 25/03343

USPC ............... 375/260, 267, 295, 299, 316, 347
See application file for complete search history.

(56) References Cited

U.S. PATENT DOCUMENTS

| | | | |
|---|---|---|---|
| 2003/0003863 A1* | 1/2003 | Thielecke et al. | 455/39 |
| 2007/0211813 A1* | 9/2007 | Talwar et al. | 375/267 |
| 2008/0069281 A1* | 3/2008 | Olesen et al. | 375/367 |
| 2008/0310523 A1* | 12/2008 | Hui et al. | 375/260 |
| 2009/0141824 A1* | 6/2009 | Xia et al. | 375/267 |
| 2009/0147728 A1* | 6/2009 | Atia et al. | 370/321 |
| 2010/0246494 A1* | 9/2010 | Sanayei | 370/328 |
| 2011/0019631 A1* | 1/2011 | Kotecha et al. | 370/329 |
| 2012/0027111 A1* | 2/2012 | Vook | H04B 7/0452 375/267 |

* cited by examiner

*Primary Examiner* — David S Huang
(74) *Attorney, Agent, or Firm* — Porzio, Bromberg & Newman, P.C.

(57) ABSTRACT

A system and method for a single spatial stream based multiple-input multiple-output (MIMO) communication system in wireless MIMO channels with a non-zero mean or a fixed component is provided which utilizes deterministic beamforming in the transmitter and deterministic combining at the receiver. For transmission and reception of a data over MIMO channels, the method and system avoids the requirement of knowledge of the instantaneous channel values at the transmitter and the receiver. By assuming perfect knowledge of the mean value of the channel matrix at the transmitter, a beamforming vector is obtained for the transmitter. The receiver utilizes deterministic receive weights which are chosen using the channel statistics.

7 Claims, 5 Drawing Sheets

Fig. 1. Prior art MIMO cellular system.

Fig. 2 MIMO cellular system in accordance with the present invention.

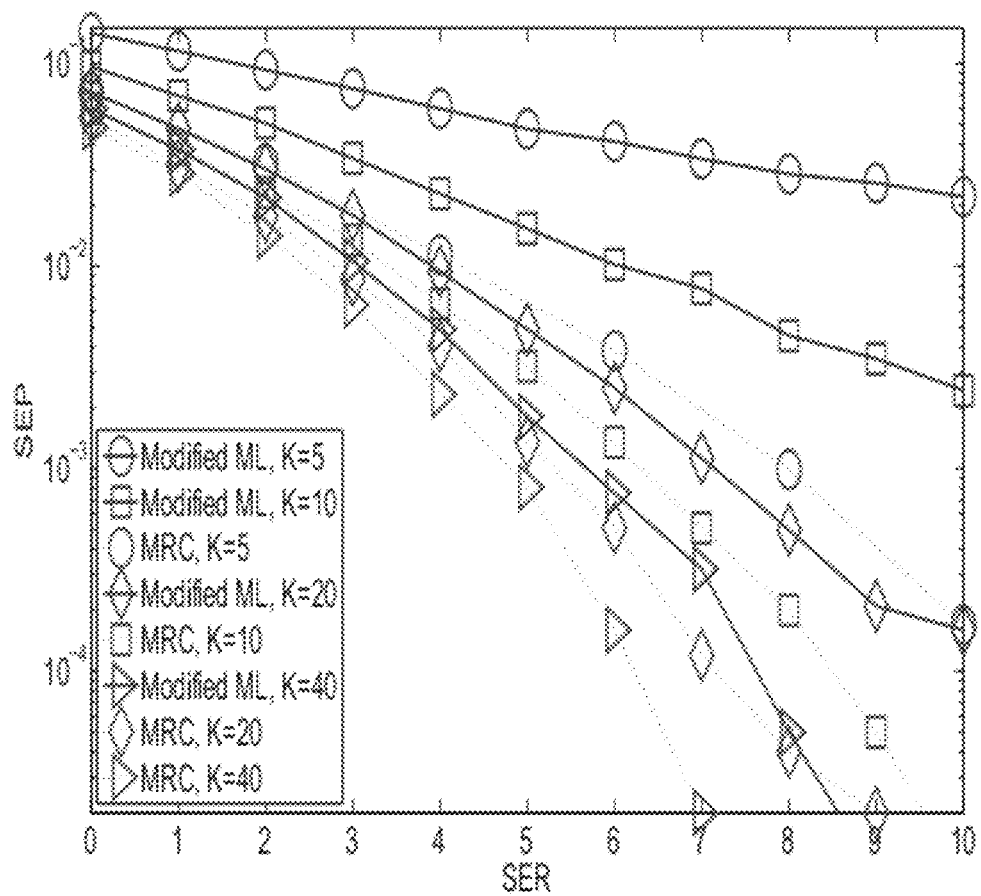
Fig. 4 SEP versus SNR plots for exponentially correlated fading with different values of the Ricean factor and QPSK signaling.

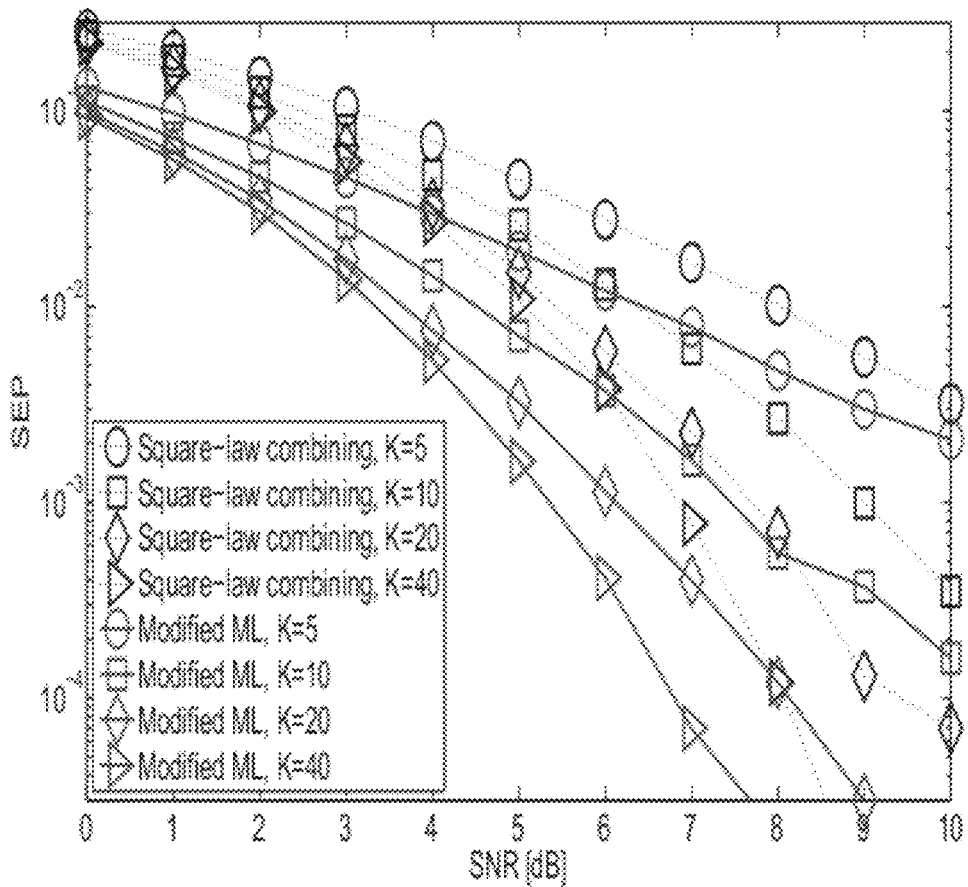
Fig. 5 SEP versus SNR plots for exponentially correlated fading with different values of the Ricean factor and orthogonal QFSK signaling.

DETERMINISTIC PROCESSING FOR MIMO SYSTEMS

CROSS REFERENCE TO RELATED APPLICATION

This application claims the benefit of U.S. Provisional Patent Application No. 61/447,237, filed Feb. 28, 2011, the entirety of which is hereby incorporated by reference into this application.

BACKGROUND OF THE INVENTION

1. Field of the Invention

The present invention relates to a multiple-input multiple-output (MIMO) communication system including deterministic processing.

2. Description of the Related Art

Multiple-input multiple-output (MIMO) communication systems are known for diversity, coding gain, and capacity improvement. In MIMO systems, transmit and receive diversity can be achieved if perfect knowledge of the channel gains is available at the transmitter and the receiver, respectively. In the transmitter, a transmit weight vector can be obtained in order to maximize a performance metric like signal-to-noise ratio (SNR) with the perfect knowledge of the MIMO channel. U.S. Pat. No. 8,073,069, hereby incorporated by reference in its entirety, describes a MIMO downlink beamforming system. For achieving receive diversity, it has been described that the receiver can use linear combining schemes such as maximal-ratio combining (MRC), equal-gain combining (EGC) and optimum combining which also require complete or partial channel state information (CSI) for decoding of the data. For estimation of the channel gains at the receiver, a training overhead is required which leads to the wastage of valuable bandwidth. In MIMO systems, the training overhead reduces the effective data rate significantly. Moreover, perfectly feeding back the exact values of the channel coefficients from the receiver to the transmitter is a challenging task since it requires a fast feedback link with very large bandwidth. Inaccurate or outdated channel values at the transmitter have the potential to destroy the transmit diversity.

Use of deterministic weights at the transmitter or at the receiver works for a channel with a non-zero mean or fixed component resulting in a finite K-factor, such as a Ricean channel and has been described in M. Vu and A. J. Paulraj, "Optimum space-time transmission for a high K factor wireless channel with partial channel knowledge," *Wireless Commun. Mob. Comput.*, vol. 4, pp. 807-816, November 2004. Capacity optimizing transmission schemes with deterministic weights have been described for the case of Ricean fading, as in M. Vu and A. Paulraj, "On the capacity of MIMO wireless channels with dynamic CSA," *IEEE Sel. Areas Commun.*, vol. 25, no. 7, pp. 1269-1283, September 2007; and M. Vu and A. J. Paulraj, "Optimum space-time transmission for a high K factor wireless channel with partial channel knowledge," *Wireless Commun. Mob. Comput.*, vol. 4, pp. 807-816, November 2004. A modified maximum likelihood (ML) receiver based on deterministic combining is proposed in R. K. Mallik and J. H. Winters "Deterministic combining for fading channels," in Conf. Rec. *IEEE International Conference on Communications (IC(:), Dresden, Germany, June* 2009, pp. 1-5, for single-input multiple-output (SIMO) communications systems.

It is desirable to provide a MIMO system in which the transmitter and the receiver utilize only the knowledge of the channel statistics for deterministic array and receiver processing.

SUMMARY OF THE INVENTION

A conventional MIMO communication system 10, with J transmit antennas 12 at base-station (BS) 14 and L receive antennas 16 at mobile user (MU) 18, is shown in FIG. 1. It is assumed that the mobile user is at the cell boundary or in a location with low signal to interference plus noise power ratio. Therefore, it is very difficult to estimate the correct channel values for the mobile user. In this case, the MU experiences poor quality of service. The handover from one cell to another cannot help in improving the quality of reception.

In the present invention, a deterministic transmission and reception based method is used to improve the quality of the reception. The deterministic communication scheme of the present invention utilizes the statistical values of the channel in place of the exact instantaneous channel values. Since the statistical characteristics of the wireless channel, such as mean and average signal-to-noise ratio (SNR), vary much slower than the instantaneous channel values, the MU can estimate these parameters much more accurately and feed them back in a timely manner to the BS. Assuming accurate knowledge of the mean value of a channel matrix at the transmitter, a beamforming vector is obtained for the transmitter. The receiver utilizes deterministic receive weights which are chosen as per the channel statistics.

The present invention relates to a MIMO communication system where the transmitter and receiver utilize deterministic weights for achieving full diversity over flat Ricean fading channels. A deterministic weight based scheme is proposed which combines deterministic transmit beamforming and deterministic receive combining in correlated Ricean fading MIMO channels. The optimized weights are obtained from the knowledge of the channel statistics and exact CSI is not required for their computation. Deterministic beamforming can utilize beamforming weights that remain constant, e.g., to improve performance where the design of the antennas in transmitter or receiver results in a fixed component of the channel correlation. A modified ML receiver detects the signal by maximizing the likelihood function of the combined received signal. The deterministic transmit weight vector follows the principle of maximum ratio transmission (MRT). The deterministic receive weight vector is chosen such that it minimizes the union bound on the symbol error probability (SEP), which is the average pairwise error probability (PEP). The proposed method is useful for a single spatial stream based MIMO system, with the MIMO used for diversity and array gain.

The invention will be more fully described by reference to the following drawings.

BRIEF DESCRIPTION OF THE DRAWINGS

FIG. 4 is a SEP versus SNR plots for exponentially correlated fading with different values of the Ricean K factor and QPSK signaling.

FIG. 5 is a SEP versus SNR plots for exponentially correlated fading with different values of the Ricean K factor and orthogonal QFSK signaling.

DETAILED DESCRIPTION

Figure 1:
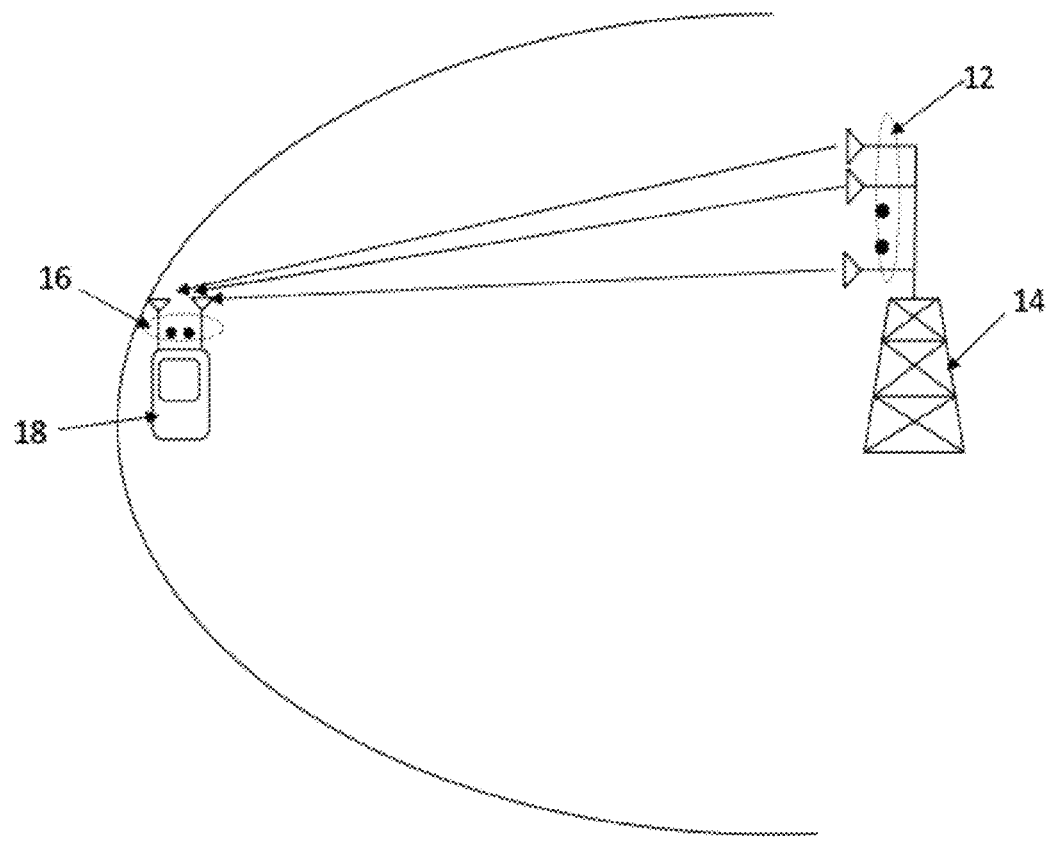
FIG. 1 is a schematic diagram of a prior art MIMO cellular system.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
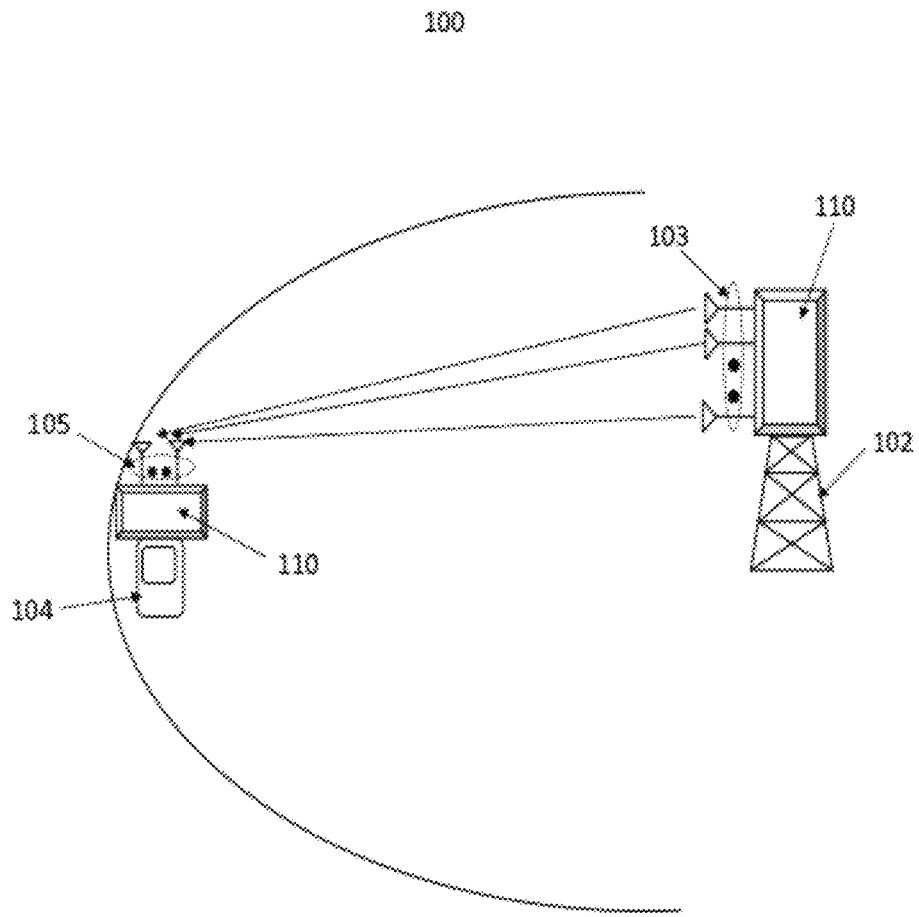
FIG. 2 is a schematic diagram of a MIMO cellular system in accordance with the teachings of the present invention.

FIG. 2 depicts wireless communication system 100 with base station 102 and mobile users 104, in accordance with the teachings of the present invention. Wireless communication system 100 is MIMO system based on wireless MIMO channels with non-zero mean or a fixed component. Each base station 102 includes an array of multiple antennas 103 for communicating with the mobile users 104. Each mobile user 104 includes respective arrays antennas 105 for communicating with base station 102. The number of antennas in the antenna arrays is station dependent. Signals transmitted from antennas 103 propagate through a MIMO channel and are received at antennas 105. Vector design unit 110 is used to jointly design the weighting vectors and combining vector for each mobile user 104 as described in the method below.

Figure 3:
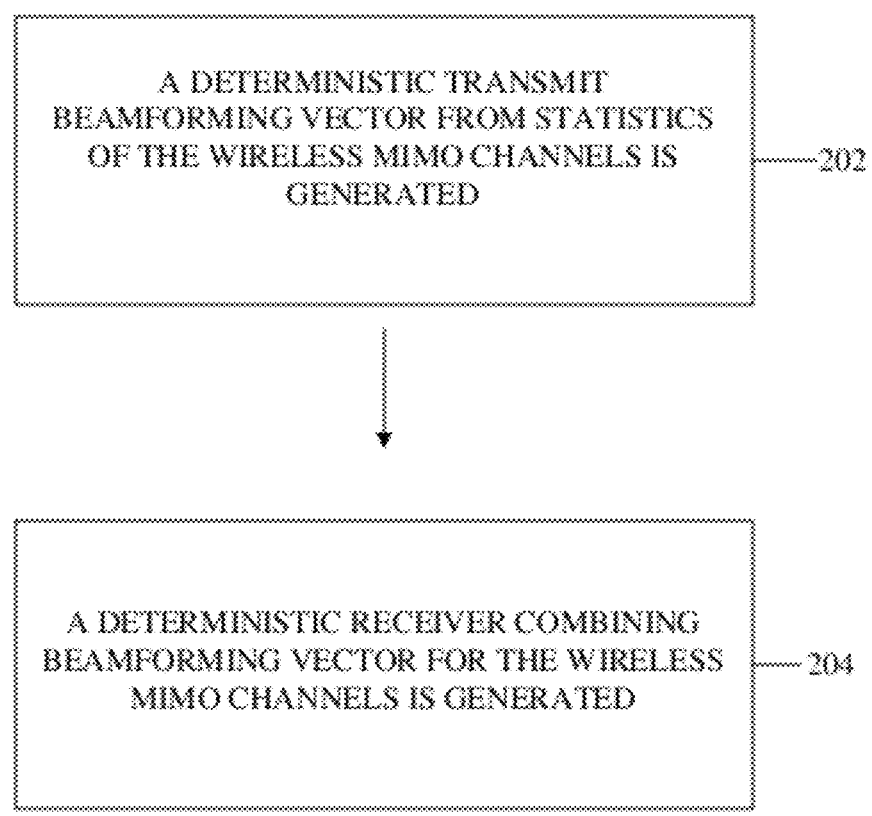
FIG. 3 is a flow diagram of a deterministic processing method.

FIG. 3 is a flow diagram of a deterministic processing method 200 for MIMO systems that represents one embodiment of a communication process between base station 202 and mobile users 204.

The received signal vector $r(t) \in C^{L \times 1}$ in a MIMO cellular system is expressed as $$r(t) = Hws(t) + n(t), \quad 0 \le t < T_s, \quad (1)$$

where $s(t) \in \{S_1(t), \ldots, S_M(t)\}$, denotes the information-bearing signal with average symbol energy $$2E_s = \frac{1}{M} \sum_{i=1}^{M} \int_0^{T_s} |S_i(t)|^2 \, dt, \quad (2)$$

$H \in C^{L \times J}$ the random complex fading gain matrix, $w \in C^{J \times 1}$ the transmit weight vector, and $n(t)$ the additive noise vector. The noise vector $n(t)$ is a zero-mean complex circular white Gaussian vector random process with power spectral density $2N_0$.

It is assumed that there exists a line of sight between the base station 102 and mobile user 104. Accordingly, a flat block-faded correlated Ricean fading MIMO channel with Ricean factor K, mean vec $|\bar{H}\rangle$, and covariance matrix R is used. The Ricean channel remains constant for long time, such as one block of data, and varies randomly between blocks. In block 202, a deterministic transmit beamforming vector is generated from statistics of the wireless MIMO channels.

A deterministic transmit weight vector as can be represented as $$w = \frac{\bar{H}^H g}{\|\bar{H}^H g\|}, \quad (3)$$

where g is a deterministic combining matrix.

A modified ML receiver for M-ary frequency shift keying (MFSK) is given by $$\hat{s} = \arg\max_{s \in \{S_1,\ldots,S_M\}} 2\, \text{Re}\left[m_h^H(w^* \otimes I_L)gg^H \sum_{j=1}^{N} r_j s_j^*\right] + \left(\frac{g^H(w^T \otimes I_L)K_h(w^* \otimes I_L)g}{2N_0\|g\|^2}\right)\left|g^H \sum_{j=1}^{N} r_j s_j^*\right|^2. \quad (4)$$

In the case of M-ary phase-shift keying (MPSK), M-ary pulse amplitude modulation (MPAM), and M-ary quadrature amplitude modulation (MQAM), a deterministic combining based receiver can be written as $$\hat{s} = \arg\min_{s \in \{S_1,\ldots,S_M\}} \frac{|g^H(r - (w^T \otimes I_L)m_h s)|^2}{g^H(|s|^2(w^T \otimes I_L)K_h(w^* \otimes I_L) + 2N_0 I_L)g} + \ln\{g^H(|s|^2(w^T \otimes I_L)K_h(w^* \otimes I_L) + 2N_0 I_L)g\}. \quad (5)$$

In block 204, a deterministic receiver combining beamforming vector is generated for the wireless MIMO channels. The deterministic weight vector g is obtained by minimizing the pairwise error probability (PEP). A choice of g which minimizes the PEP can be obtained by solving $$(g^* \otimes I_L)g = \eta_1 (E_s K_h^{-1})^{-1} m_h^{-1}, \quad (6)$$

where $K_h^{-1} = (\bar{H}^{*-1} I_L) K_h (\bar{H}^{T-1} I_L)$, $m_h^{-1} = (\bar{H}^{*-1} I_L) m_h$, and $h_1$ is any real positive scale factor. It can be seen from (3), (4), (5), and (6) that the deterministic communication system of the present invention utilizes the mean and covariance matrices of the MIMO channel instead of the instantaneous channel values.

The invention can be further illustrated by the following example thereof, although it will be understood that this example is included merely for purposes of illustration and is not intended to limit the scope of the invention unless otherwise specifically indicated.

Example

In order to verify wireless communication system 100, a simulation was preformed with a correlated MIMO system with two transmit and two receive antennas (J=L=2), and orthogonal QFSK (M=N=4) and QPSK (M=4, N=1) signaling. The channel is assumed to be an exponentially correlated MIMO Ricean channel with $|R|_{i,j}=r^{|i-j|}$, $1 \pounds\{i,j\}\pounds JL$, r=0.15 and the Ricean factor K=5, 10, 20, 40. The deterministic part of the MIMO channel is given by $$\bar{H} = \begin{bmatrix} 1.2397 & 1.0143 \\ 0.9405 & 0.7413 \end{bmatrix}. \quad (7)$$

All simulations are obtained for $10^5$ channel realizations. The SNR G, which is taken as the average SNR per branch, is given by T=(Es/N0)(1+K).

FIG. 4 shows the SEP versus SNR plots of the proposed deterministic combining based receiver of the present invention versus a square-law combining receiver for QFSK signaling for different values of the Ricean factor, as described in W. C. Lindsey, "Error probabilities for Rician fading multichannel reception of binary and N-ary signals," IEEE *Mans. Inform. Theory.*, vol. 10, no. 4, pp. 339-350, October 1964. Equal weights at the transmitter for the square-law combining based MIMO system were used. It is shown in FIG. 4 that the modified ML receiver of the present invention outperforms the square-law combining receiver, and the performance gap increases with increase of the value of K, i.e., better line of sight.

The SEP versus SNR of the modified ML receiver of the present invention and an MRC combining based receiver for a QPSK constellation for different values of K is shown in FIG. 5. The MRC based receiver utilizes the perfect knowledge of the CSI, at the transmitter and the receiver to obtain optimum transmit beamforming and receive combining vectors. The modified ML receiver of the present invention utilizes knowledge of the channel statistics for transmitting and detecting the transmitted signal waveform. Although the MRC receiver, owing to perfect CSI being available, performs better than the modified ML receiver of the present invention, it was found that the performance gap between the modified ML of the present invention and the MRC receivers decreases with increase of K, i.e., better line of sight.

Example features of the present invention are as follows:

(i) The beamforming vector of the present invention can be chosen without perfect knowledge of the instantaneous channel values at the transmitter.

(ii) The receiver of the present invention does not need the perfect knowledge of the channel gains for decoding the data belonging to the practical constellations.

(iii) Since the system of the present invention avoids the perfect channel estimation, it avoids the unnecessary training data transmission and is useful for high data rate wireless systems.

(iv) The SEP versus SNR performance of the receiver of the present invention gets closer to the MRC based receiver with increase in the value of the line of sight parameter. Therefore, not much performance is lost as compared to the optimal receiver when the MU is very far from the BS and there is a good line of sight between them. Since it is difficult to implement optimal reception in such scenario, the present invention provides an implementation to achieve diversity and increase data rate.

The methods and systems for efficiently providing accurate processing in wireless, multi-input, multiple output (MIMO) system as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, preceding the modulated signals, preconditioning the precoded signals, designing the transmit beamforming vectors, and so on) and/or at the receiver (e.g., recovering the transmitted signals, demodulating and decoding the recovered signals, designing the receive beamforming vectors) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

That is, all computations, data manipulations and data storage can be performed using a computer. A processor can be controlled by programming information to implement all steps in the present method.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A wireless communication method using a multiple-input multiple-output (MIMO) communication system based on wireless MIMO channels with a non zero mean or a fixed component comprising the steps of:

generating a deterministic transmit beamforming vector from channel statistics of the wireless MIMO channels, the channel statistics of said wireless MIMO channels are the mean and covariance matrices of the wireless MIMO channels, the channel statistics are not instantaneous channel state information; and generating a deterministic receiver combining beamforming vector for the wireless MIMO channels by minimizing pairwise error probability, wherein the deterministic transmit beamforming vector is generated without instantaneous channel state information and wherein the generated deterministic transmit beamforming vector and generated deterministic receiver combining beamforming vector are fixed components which remain constant over time.

2. The method of claim 1 wherein the channel statistics of said wireless MIMO channels are known at the transmitter through feedback to the transmitter from the receiver.

3. The method of claim 1 wherein the multiple-input multiple-output (MIMO) is a single spatial stream based MIMO.

4. A multiple-input multiple-output (MIMO) wireless communication system comprising:

a transmitter having a plurality of transmit antennas having a transmission scheme including a deterministic transmit beamforming vector generated from channel statistics of wireless MIMO channels and transmitting a signal using the transmission scheme through the plurality of transmit antennas, the channel statistics of said wireless MIMO channels are the mean and covariance matrices of the wireless MIMO channels, the channel statistics are not instantaneous channel state information; and at least one receiver having a plurality of receive antennas for processing a signal through the plurality of receive antennas in a reception scheme including a deterministic receiver combining beamforming vector generated by minimizing pairwise error probability, wherein the deterministic transmit beamforming vector is generated without instantaneous channel state information and wherein the generated deterministic transmit beamforming vector and generated deterministic receiver combining beamforming vector are fixed components which remain constant over time.

5. The system of claim 4 wherein the channel statistics of said wireless MIMO channels are known at the transmitter through feedback to the transmitter from the receiver.

6. The system of claim 5 wherein the multiple-input multiple-output (MIMO) is a single spatial stream based MIMO.

7. The system of claim 6 wherein the wireless MIMO channel is Ricean.

* * * * *